Oct. 22, 1935.  R. E. WOLF  2,018,431
ELECTRIC FLOW METER
Filed July 11, 1931   2 Sheets-Sheet 1
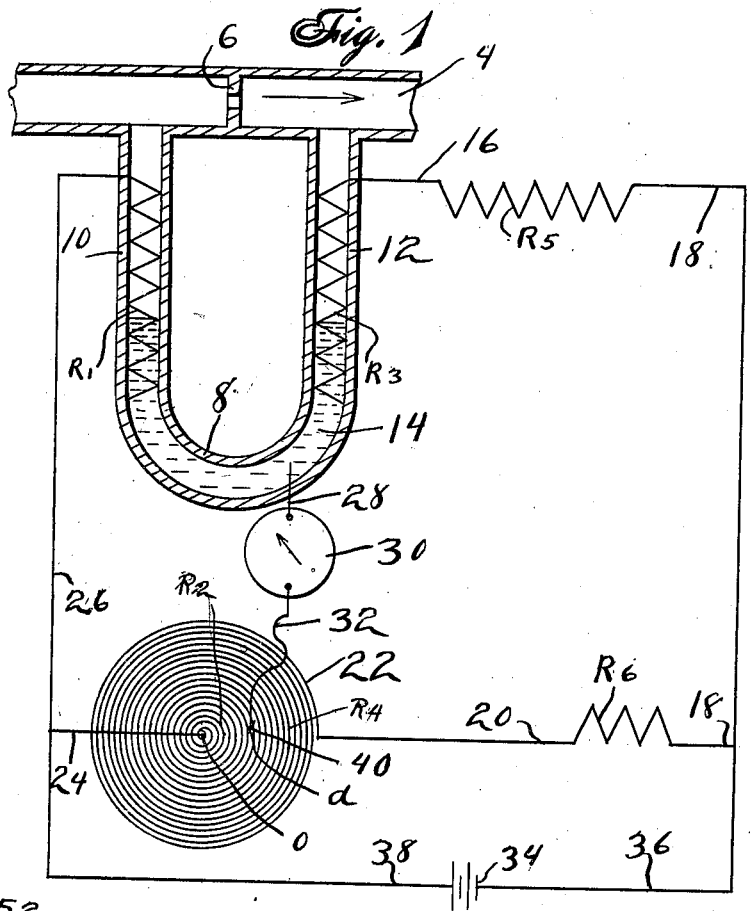
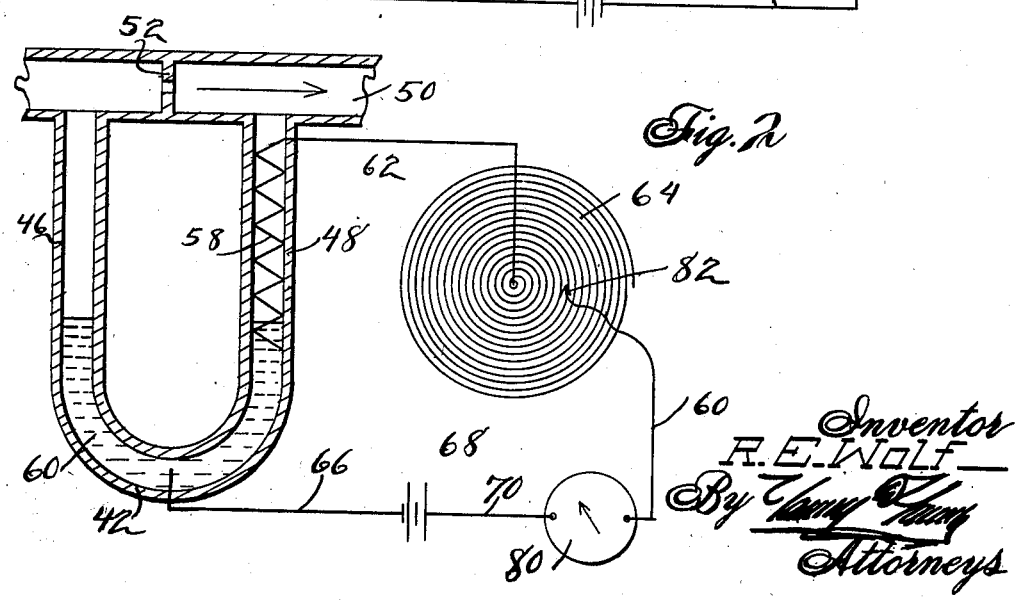
Inventor
R. E. Wolf
By [signature]
Attorneys

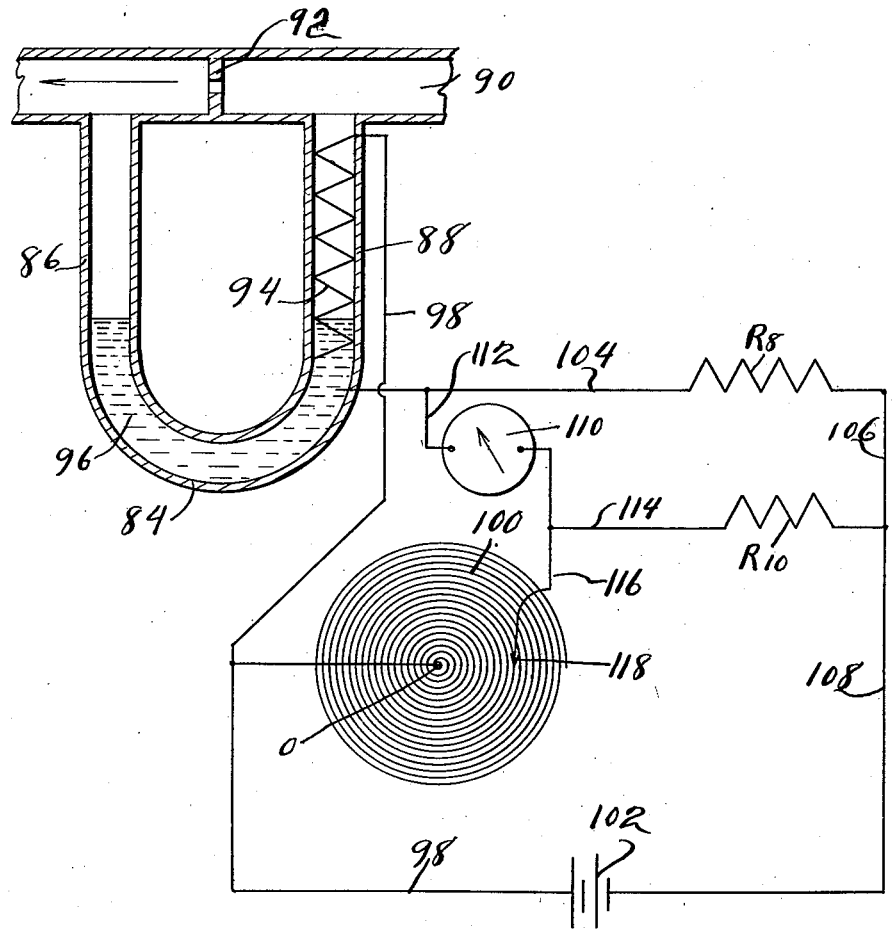

Patented Oct. 22, 1935

2,018,431

UNITED STATES PATENT OFFICE 2,018,431

ELECTRIC FLOW METER

Robert E. Wolf, Milwaukee, Wis.

Application July 11, 1931, Serial No. 550,096

2 Claims. (Cl. 177—351)

The present invention relates to measuring devices and more particularly to an electrical measuring device especially adapted for measuring the flow of fluid through an orifice.

One of the objects of the invention is to provide an accurate measuring device which does not require or necessitate the use of the ordinary complicated moving parts.

Another object of the invention is to provide an electrical fluid flow measuring device which does not require or necessitate the use of the ordinary complicated moving parts.

Another object of the invention is to provide an electrical fluid flow measuring device in which the instruments from which the readings are obtained may be remotely located from the orifice through which the fluid is flowing.

A still further important object of the invention is to provide a specially constructed variable resistance which when properly connected in circuit with any electrical measuring circuit will give uniform readings for square root or square functions.

The invention contemplates the use of a manometer having its legs arranged in the usual manner on each side of an orifice. In each leg there is provided resistances which are varied in accordance with the change in pressure by means of a mercury well. The resistances and mercury well are connected in a bridge circuit with two fixed resistances, a source of electrical supply, a galvanometer and a specially constructed flat spiral resistance in such a manner that when the bridge circuit is balanced the flow of fluid through the orifice causing the difference in pressure in the manometer is directly proportional to the distance from the center of the spiral to the point of contact of the galvanometer conductor therewith.

In the accompanying drawings forming a part of this application and in which like numerals are employed to designate like parts throughout the same, Figure 1 is a schematic diagram of the electrical connections of the measuring device illustrating the manner in which the resistances in the manometer are varied by means of the mercury well and the manner in which the flat spiral resistance is connected in circuit therewith, Figure 2 is a schematic diagram of the electrical connections of a modified form of the invention, Figure 3 is a schematic diagram of the electrical connections of a further modified form of the invention in which the flat spirally constructed resistance is arranged in a bridge circuit similar to that illustrated in Figure 1.

In the drawings wherein for the purpose of illustration is shown a preferred embodiment of the invention, the numeral 4 designates a conduit in which there is arranged an orifice 6. In the usual manner, a manometer 8 has its legs 10 and 12 disposed respectively on each side of the orifice 6. Resistances $R_1$ and $R_3$ are respectively arranged in legs 10 and 12 of the manometer. The mercury in the well 14 in the manometer due to the change of pressure in the orifice will rise and fall and consequently vary the ratio of the two exposed portions of the resistances 10 and 12 directly as the differential in pressure in the two legs of the manometer. The upper end terminal of resistance $R_3$ is connected by conductor 16 to one terminal of the fixed resistance $R_5$. The other terminal of the fixed resistance $R_5$ is connected by conductor 18 to one of the terminals of fixed resistance $R_6$ and the other terminal of fixed resistance $R_6$ is connected by conductor 20 to the outermost free end of the flat spiral resistance 22 which can be considered as an Archimedean spiral. The inntermost terminal of the flat spiral resistance 22 is connected by means of conductor 24 to conductor 26 which is connected to the upper end terminal of resistance $R_1$ disposed in leg 10 of the manometer 8. The mercury well 14 in the manometer 8 is connected by conductor 28 to one terminal of a galvanometer 30, the other terminal of which is connected to conductor 32 having on its free end thereof a clip contact adapted to be secured at any point on the convolutions of the flat spiral resistance. A source of electrical supply 34 is connected by conductor 36 to conductor 18 and by conductor 38 to conductor 24 completing the bridge circuit.

As will be seen the rise and fall of the mercury in the manometer due to the change in pressure will vary the ratio of the two exposed portions of the resistances $R_1$ and $R_3$ directly as the differential in pressure in the two legs of the manometer. The contact 40 on conductor 32 is then placed at a point on one of the turns of the flat spiral resistance where the ratio of the resistances in the bridge circuit is such that the galvanometer will indicate that there is no current flowing therethrough. The bridge circuit will then be balanced. Since the length of an Archimedean spiral from the center is approximately proportional to the square of the radius for many turns, therefore, its resistance will vary as the square of the radius of the spiral and when the bridge circuit is balanced in the aforementioned manner the flow causing the difference in pressure in the manometer is directly proportional to the distance from the center of the spiral to the point of contact of the galvanometer conductor 40 or the flow is equal to a constant times $od$ where $o$ is the center of the spiral and $d$ is the point of contact of the galvanometer conductor. The equation may be derived as follows:

In Figure 1 we have two parallel circuits, one composed of the resistances $R_1$, $R_3$ and $R_5$, and the other of $R_2$, $R_4$, and $R_6$. The sum of the resistances in each circuit remains constant for any adjustment of the bridge circuit.

If we let $I_1$ equal the current through $R_1$ and $I_2$ equal the current through $R_2$; then $R_1 I_1$ equals $R_2 I_2$ or $R_1/R_2$ equals $I_2/I_1$ when the bridge is in balance _____ (1)
Likewise $$\frac{R_1+R_3+R_5}{R_2+R_4+R_6}=I_2/I_1 \qquad (2)$$

Combining (1) and (2)

$$R_1/R_2=I_2/I_1=\frac{R_1+R_3+R_5}{R_2+R_4+R_6} \qquad (3)$$

Since the sum of the resistances in each circuit remains constant, we have:—

$R_1/R_2=K$ _____ or $R_1=KR_2$ _____ (4)

From the law of flow through an orifice we have:—

Flow$=K_1\sqrt{\text{Pressure}}$ or $F=K_1\sqrt{R_1}$ since $R_1$ varies with pressure _____ (5)

From the law of the Archimedean spiral, its length and hence its resistance are approximately proportional to the square of the radius for many turns, hence, approximately $R_2=K_2 (od)_2$ _____ (6)

combining (4), (5), (6) we have

Flow$=K_2\sqrt{(od)^2}=K_3 (od)$ _____ (7)

It will thus be seen that the value of K depends on the values of the various resistances in the circuit and upon the selection of the orifice. This permits the changing of the range of any instrument using the circuit by merely changing the ratio of fixed resistances $R_5$ and $R_6$ and the flow can be ascertained directly after the balancing of the bridge circuit by multiplying the radius of the spiral resistance by a constant.

As illustrated in Figure 2, a manometer 42 having legs 46 and 48 respectively is connected in the usual manner in a conduit 50 on each side of an orifice 52. A resistance 58 in leg 48 of the manometer 42 is varied due to the change in pressure in the manometer by means of the mercury well 60. The upper end terminal of the resistance 58 is connected by conductor 62 to the center of the flat Archimedean spiral resistance 64. The mercury column 60 is connected through conductor 66 to one terminal of the source of supply 68 and the other terminal of the source of supply 68 is connected by conductor 70 to one terminal of a galvanometer 80. The other terminal of the galvanometer 80 is connected by conductor 68 which has arranged on its free end thereof a clip contact adapted to be positioned at any point on the flat spiral resistance.

In this arrangement if the current flow through the galvanometer 80 is maintained at a constant value by varying the position of the contact 82 on the spiral resistance the flow through the orifice will be directly proportional to the radius of the spiral in the electrical circuit.

As illustrated in a further modified form of the invention in Figure 3, a manometer 84 having legs 86 and 88 is connected in a conduit 90 provided with an orifice 92. In leg 88 of the manometer 84 which is arranged in front of the orifice 92 with respect to the flow of fluid in the conduit 90, there is disposed a resistance 94. The pressure change in the manometer 84 varies the resistance 94 by means of a mercury well 96. The upper free end terminal of the resistance 94 is connected by conductor 98 to the center terminal $o$ of the flat spiral resistance 100 and to one terminal of the source of electrical supply 102. The mercury well is connected by conductor 104 to one terminal of fixed resistance $R_8$ and the other terminal of fixed resistance $R_8$ is connected by conductor 106 to one terminal of fixed resistance $R_{10}$ and to the other terminal of the source of electrical supply by conductor 108. One terminal of the galvanometer 110 is connected by conductor 112 to the mercury well and the other terminal of the galvanometer 110 is connected by conductor 114 to the other terminal of fixed resistance $R_{10}$. Conductor 114 is connected to one end of conductor 116 the other end of which is provided with a clip contact 118 adapted to be electrically connected at any point on the flat spiral resistance.

It will thus be seen that this bridging circuit which is somewhat similar to the bridging circuit described in Figure 1 provides a circuit wherein the flow through the orifice 92 when the bridging circuit is balanced will be directly proportional to the radius of the flat spiral resistance denoted by the distance from the center $o$ of the flat spiral spring to the point of contact of the snap contact 118.

Obviously, the invention is not limited to any particular bridging circuit nor to the specific measurement of the flow of a fluid through an orifice but inasmuch as the length of such a spiral varies as the square of its radius, its resistance will vary as the square of the radius, and it may be applicable to any electrical measuring circuit which will give uniform readings for square root or square functions.

Having thus described the invention, what is claimed is:

1. In a device for measuring the flow of fluid through an orifice, a pair of resistances, means associated with said resistances and said orifice for varying the value of said resistances depending upon the difference in pressure on each side of said orifice, a bridge circuit including said resistances, a source of electrical supply, an ammeter and an Archimedean spiral resistance, whose resistance is approximately proportional to the square of the radius, said spiral resistance being variable to balance said bridging circuit whereby the flow of fluid through said orifice will be equal to a constant times the radius of the spiral resistance.

2. In a device for measuring the flow of fluid through an orifice, a manometer having its legs in communication with each side of said orifice, a resistance in one leg thereof, an electrical conducting fluid responsive to the pressure change in said manometer for varying said resistance, an electrical circuit including said resistance, an Archimedean spiral resistance, whose resistance is approximately proportional to the square of the radius, an ammeter and a source of supply, said spiral resistance being adapted to be varied to maintain the current flowing in said circuit at a constant value whereby the flow through said orifice will be directly proportional to the radius of the spiral resistance.

ROBERT E. WOLF.